J. F. McCAIN.
JAR OPENER.
APPLICATION FILED MAR. 3, 1906.
900,297.
Patented Oct. 6, 1908.
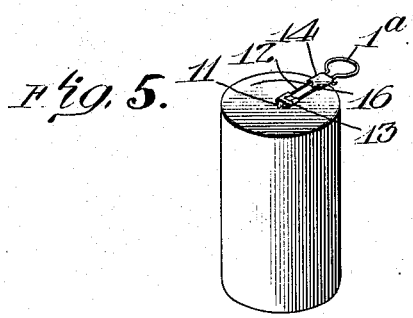
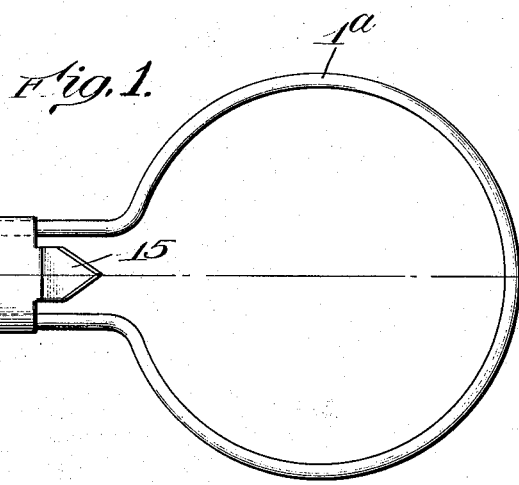
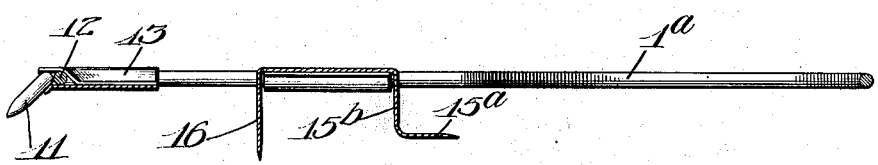
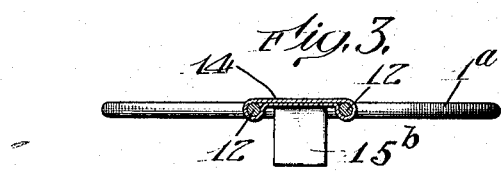
Witnesses:
Robert A. Weir
F. H. Drury
Inventor:
Joseph F. McCain
By Bulkley & Durand
Attys.

UNITED STATES PATENT OFFICE.

JOSEPH F. McCAIN, OF CHICAGO, ILLINOIS.

JAR-OPENER.

No. 900,297.　　　Specification of Letters Patent.　　　Patented Oct. 6, 1908.

Application filed March 3, 1906. Serial No. 303,971.

*To all whom it may concern:*

Be it known that I, JOSEPH F. MCCAIN, a citizen of the United States of America, and resident of Chicago, Illinois, have invented a certain new and useful Improvement in Jar-Openers, of which the following is a specification.

My invention relates to improvements in jar openers, and has for its object the production of a device that may be readily applied to glass fruit jars for the purpose of removing the cover therefrom.

A further object is the production of a device that can be cheaply constructed, and one that is least liable to get out of order.

These and such other objects as may hereinafter appear are attained by my device, embodiments of which are illustrated in the accompanying drawings, in which—

Figure 1 is a plan view of my device; Fig. 2 is a sectional view on the line A—A of Fig. 1, looking in the direction indicated by the arrows; Fig. 3 is a sectional view on line B—B of Fig. 1, looking in the direction indicated by the arrows; Fig. 4 is a sectional view on line C—C of Fig. 1, looking in the direction indicated by the arrows; and Fig. 5 is a perspective view showing my device used in opening an ordinary tin can.

Like letters of reference indicate like parts in the several figures of the drawing.

Referring to Fig. 1, the ends of the ring member $1^a$ are extended outwardly, one side terminating in a pivot point 11, and the two elongations 12 furnishing a handle for the device. In order to retain the end of the handle in position a cap 13 is placed thereon, the pivot point 11 extending through the end of the cap. A metallic strip or collar 14 encircles the handle, having a pointed wedge-shaped projection 15 extending toward the ring, and the downwardly projecting portion 16 forming a cutting edge or knife blade. The projecting wedge comprises a horizontally extending portion $15^a$ and the upwardly extending portion or shank $15^b$; all, however, being preferably composed of one piece and integral with the sliding collar 14 and the knife edge 16.

The principal use for which my device is intended to be used is the opening of filled Mason jars. It is well-known that in putting up fruit the material is placed in jars hot and full to the top. A rubber gasket is placed over the neck of the jar and a top screwed in place. As the contents of the jar are boiling hot, the space between the top of the jar and the material is filled with steam which when cooled creates a partial vacuum, holding the cover more tightly in place and preventing the admission of air. After the jar has been sealed for any considerable length of time, the cover becomes so tightly secured in place as to make it very difficult, if not impossible, to remove the same without the use of some instrument and with a consequent danger of breaking the jar. By using my device the ring member $1^a$ is placed over the top of the jar and the pointed wedge 15 inserted between the bottom of the gasket and the top of the body of the jar. The device is then twisted entirely around the jar, loosening the gasket and allowing air to enter, thus destroying the vacuum. The cover can then be readily unscrewed by the use of very little force.

In the event that the device illustrated in Fig. 1 is desired to be used for a can opener, the downwardly projecting pivot 11 is pressed into the center of the can and the cutting knife 16 pressed into the top at any desired point and the device is revolved on the pivot 11, using the ring $1^a$ as a handle.

I claim:—

1. A jar opener formed from a single wire, comprising a ring-shaped portion, a handle extending therefrom, said handle comprising parallel members, a frame movably seated on said members and carrying a wedge-shaped member extending toward the ring-member.

2. A jar opener formed from a single wire, comprising a ring-shaped portion, a handle extending therefrom, said handle comprising parallel members spaced apart, a frame movably seated on said members and carrying a wedge-shaped member extending toward the ring-member.

3. A jar opener formed from a single wire, comprising a ring-shaped portion, a handle extending therefrom, said handle comprising parallel members spaced apart, a frame movably seated on said members and carrying a wedge-shaped member extending toward the ring-member and located in a plane below that of the ring-member.

Signed by me at Chicago, Cook county, Illinois, this 20th day of Feb. 1906.

JOSEPH F. McCAIN.

Witnesses:
　S. LEWIS,
　ALBERT JOHN SAUSER.